United States Patent
Goller et al.

(10) Patent No.: US 8,268,134 B2
(45) Date of Patent: Sep. 18, 2012

(54) SYSTEM FOR PROTECTING TURBINE ENGINE SURFACES FROM CORROSION

(75) Inventors: George Albert Goller, Greenville, SC (US); Paul Stephen Dimascio, Greer, SC (US); Rebecca Evelyn Hefner, Greenville, SC (US)

(73) Assignee: General Electric Company, Schenectady, NY (US)

( * ) Notice: Subject to any disclaimer, the term of this patent is extended or adjusted under 35 U.S.C. 154(b) by 193 days.

(21) Appl. No.: 12/785,258

(22) Filed: May 21, 2010

(65) Prior Publication Data

US 2011/0284367 A1    Nov. 24, 2011

(51) Int. Cl.
*C23F 13/06* (2006.01)
*C23F 13/14* (2006.01)
*C23F 13/18* (2006.01)

(52) U.S. Cl. ........ 204/196.37; 204/196.02; 204/196.04; 204/196.06; 204/196.07; 204/196.1; 204/196.22; 204/196.23; 204/196.24; 204/196.25

(58) Field of Classification Search ............ 204/196.02, 204/196.04, 196.06, 196.07, 196.1, 196.22–196.25, 204/196.37
See application file for complete search history.

(56) References Cited

U.S. PATENT DOCUMENTS

| | | | | |
|---|---|---|---|---|
| 5,411,646 | A | * | 5/1995 | Gossett et al. ............... 205/724 |
| 2007/0085345 | A1 | * | 4/2007 | Brown et al. .................. 290/44 |
| 2007/0251834 | A1 | * | 11/2007 | Bollinger ..................... 205/727 |
| 2011/0203555 | A1 | * | 8/2011 | Reinhart et al. .............. 123/536 |
| 2011/0284368 | A1 | * | 11/2011 | Goller et al. ............. 204/196.02 |

OTHER PUBLICATIONS

MTO Investigates New Cathodic Protection Systems Revolutionising Bridge Rehabilitation; Ontario's Transportation Technology Transfer Digest—Feb. 2004—vol. 10, Issue 1; Ministry of Transportation Road Talk; http://www.mto.gov.on.ca/english/transtek/roadtalk/rt10-1/; p. 1 and 2.

LIDA Tubular Anodes; Cathodic Protection, De Nora Elettrodi Network.

Dr. Ing et al.; Article—History of EFC-WP11 "Corrosion in Concrete"; Institute for Building Materials Research, ibac, Aachen University; 9 pages.

* cited by examiner

*Primary Examiner* — Bruce Bell
(74) *Attorney, Agent, or Firm* — Fletcher Yoder, P.C.

(57) ABSTRACT

According to various embodiments, a system includes a turbine engine component that includes a first material having a surface exposed to a fluid flow path and a sacrificial anode layer disposed on the surface. The sacrificial anode layer includes a second material that is electrochemically more active than the first material and the second material is configured to preferentially corrode to protect the first material from corrosion.

20 Claims, 6 Drawing Sheets

SYSTEM FOR PROTECTING TURBINE ENGINE SURFACES FROM CORROSION

BACKGROUND OF THE INVENTION

The subject matter disclosed herein relates to turbine engines, and, more particularly, to protecting turbine engine surfaces from corrosion.

Turbine engines extract energy from a flow of fluid and convert the energy into useful work. For example, an integrated gasification combined cycle (IGCC) power plant includes one or more gas turbine engines that combust gases, such as syngas or natural gas, to generate energy. The combustion of the gases creates hot exhaust gases, which may contain corrosive components. During typical operating conditions of the gas turbine engine, the corrosive components may corrode gas turbine engine surfaces in contact with the hot exhaust gases. Corroded parts of the gas turbine engine may be repaired or replaced. Parts of the gas turbine engine in contact with the hot exhaust gases may be made from corrosion resistant alloys to reduce corrosion. However, these alloys may be expensive and/or difficult to fabricate into gas turbine engine parts.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine engine component that includes a first material having a surface exposed to a fluid flow path and a sacrificial anode layer disposed on the surface. The sacrificial anode layer includes a second material that is electrochemically more active than the first material and the second material is configured to preferentially corrode to protect the first material from corrosion.

In a second embodiment, a system includes a gas turbine engine that includes a first material having a surface exposed to a flow path of hot condensing combustion gas and a patterned anode layer that includes a second material disposed on the surface. The patterned anode layer is configured to protect the surface from corrosion by the hot condensing combustion gas.

In a third embodiment, a system includes a patterned anode layer configured to protect a surface of a combustion system from corrosion by hot condensing combustion gas, a reference electrode in contact with the hot condensing combustion gas, and a controller configured to adjust a current to the patterned anode layer in response to feedback from the reference electrode.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
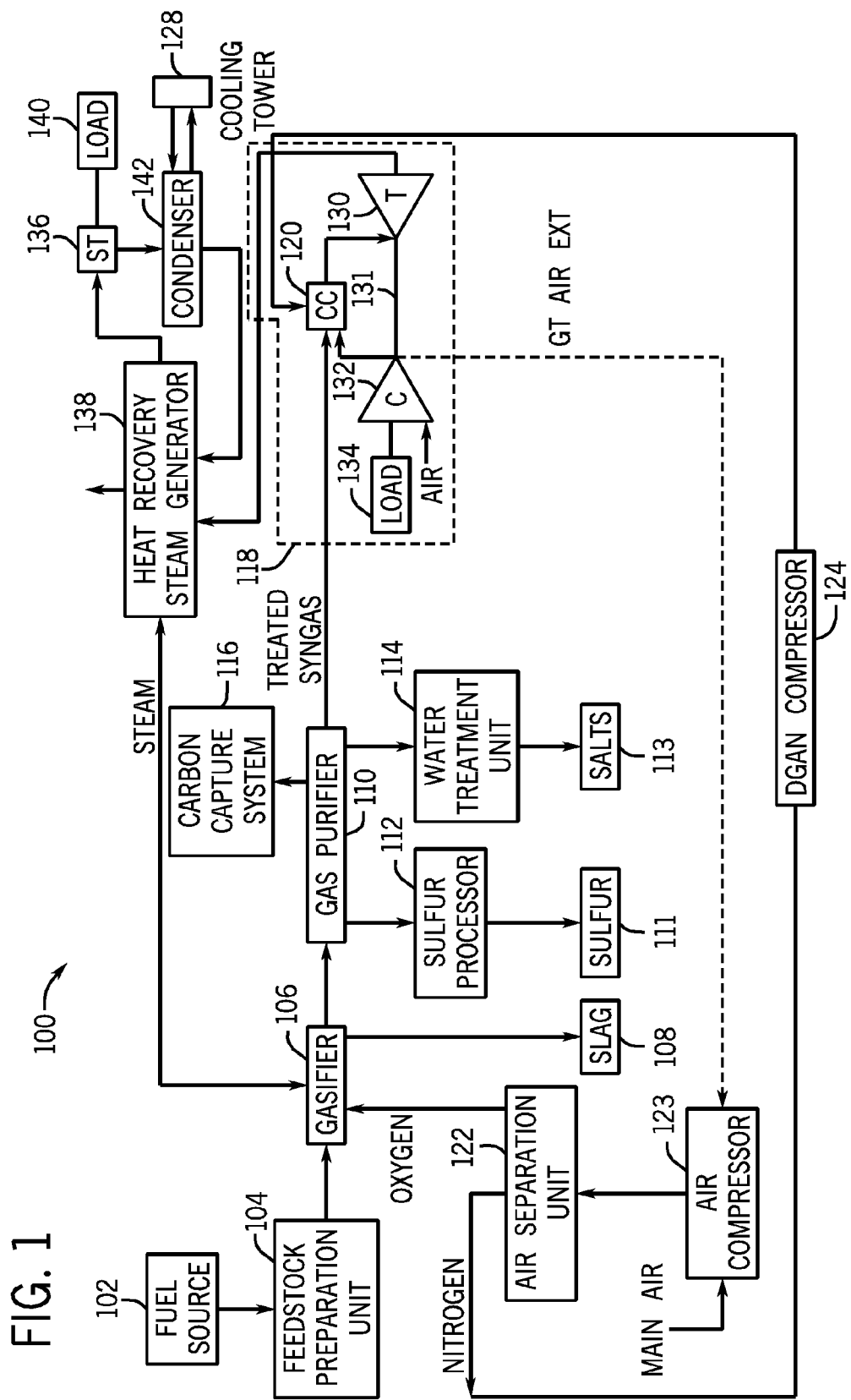
FIG. 1 is a block diagram of an IGCC power plant incorporating a gas turbine engine according to an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Corrosion may refer to an electrochemical oxidation of metals reacting with an oxidant, such as oxygen. Corroded metal components may be replaced or repaired because the metal oxides may not have the same properties as the original metal. The conditions in a turbine engine, such as a gas turbine engine of an IGCC power plant may contribute to at least two types of corrosion. Similar corrosion mechanisms may occur in other turbines, such as steam turbines or hydro-turbines. First, aqueous corrosion may result from an electro-chemical reaction associated with differences in electrical potentials of two different, electrically connected metals in an aqueous medium. The two different metals may be referred to as an active metal and a noble metal. Ions of noble metals are more strongly bound to a surface of the noble metal than ions of active metals. In addition, the noble and active metals may be electrically connected by being in physical contact with one another. Furthermore, examples of aqueous media, also referred to generally as electrolytes, may include, but are not limited to, solutions of acids, bases, or salts, certain gases at high temperatures, molten salts, or combinations thereof. Specifically, hot combustion gases in the turbine engine may condense to form a liquid on the walls of the turbine engine and on other equipment.

During the electrochemical reaction of aqueous corrosion, ions from the active metal are released and flow through the aqueous medium to join with the noble metal. Concurrently, electrons flow from the active metal, or anode, to the noble metal, or cathode, through the electrical connection. By releasing its ions, the active metal may continue to corrode until it is completely consumed. In contrast, the noble metal may either not be affected or may corrode at a slower rate than the active metal. Examples of noble metals include, but are not limited to, silver, platinum, and gold. Furthermore, examples of active, or base, metals include, but are not limited to, iron, nickel, lead, and zinc. In certain gas turbine engines, aqueous corrosion may occur where two different metals are in contact with one another in the presence of a salt, such as ammonium chloride ($NH_4Cl$), in the presence of water. The $NH_4Cl$ may be produced as a by-product in a gasifier upstream of the gas turbine engine and water may be introduced by injection of steam into the gasifier.

In other gas turbine engines, two different metals may not be present, but aqueous corrosion can still occur according the following process. Certain metal surfaces of the gas turbine engine may be passivated, which refers to a formation of a thin layer of metal oxide that acts as a barrier to further corrosion under conditions specific to the metal. Examples of metals that may undergo passivation include, but are not limited to, aluminum, stainless steel, titanium, or combinations thereof. An active-passive cell is created when salt deposits, such as $NH_4Cl$, in the presence of water form in areas of the metal where the passive film is broken. An electrical potential develops between the large area of the passive film, which acts as the noble metal or cathode, and the small area of active, unpassivated metal, which acts as the anode. Thus, even gas turbine engine components made from a single metal may be subject to aqueous corrosion.

A second type of corrosion that may occur in a gas turbine engine is molten salt corrosion. Exhaust gases flowing through the gas turbine engine may be hot enough that the $NH_4Cl$ exists as a corrosive gas. When the $NH_4Cl$ gas and/or other corrosive gases contact the cooler surfaces of the gas turbine engine, the gases may condense into a liquid, also referred to as a molten salt. As described above, certain metal surfaces of the gas turbine engine may be passivated. Unfortunately, the protective metal oxide layer may dissolve into the molten salt layer upon contact. Any oxygen that may be present in the gas turbine engine may then dissolve into the molten salt layer, causing loss of metal from the surface as it forms additional metal oxide to replace the lost protective layer. During this process, the unprotected metal acts as an anode, releasing electrons that flow to other areas of the metal that act as a cathode. This process may cause further corrosion of the metal in contact with the molten salt. Because of the high temperatures necessary for molten salt corrosion, it may be limited to surfaces of the gas turbine engine in contact with the hot exhaust gases, commonly referred to as a hot gas path or combustion gas path. In addition, other types of corrosion, such as, but not limited to, pitting corrosion, intergranular corrosion, crevice corrosion, high temperature corrosion, or combinations thereof, may occur in gas turbine engines or in turbine engines generally.

In particular embodiments discussed below, anodes may be used to help reduce aqueous corrosion, molten salt corrosion, or possibly other types of corrosion that may occur in turbine engines. For example, sacrificial anode layers may be placed in electrical contact with metal surfaces to be protected from corrosion. Specifically, sacrificial anode layers are made from metals that are more electrochemically active than the metal surfaces of the gas turbine engine component. A hierarchy of metals, referred to as a galvanic series, may be used to determine whether a particular metal is more or less electrochemically active than another metal. More noble metals may be near one end of the galvanic series and more active metals may be near the other end of the galvanic series. Two metals are submerged in an electrolyte while electrically connected to determine the sequence of metals for the galvanic series. The less noble metal will experience galvanic corrosion. Moreover, the difference in nobility of the metals affects the rate of galvanic corrosion, which may be measured as a difference in voltage potential. Thus, two metals with a large difference in voltage potential may be farther apart in the galvanic series. In addition, the rate of galvanic corrosion may be affected by the electrolyte. Thus, the sequence of metals in the galvanic series may differ depending on the electrolyte.

Using the appropriate galvanic series based on the conditions in the gas turbine engine, the metal for the sacrificial anode layer is selected from those metals that are more electrochemically active than the metal used for the gas turbine engine component. Thus, the sacrificial anode layer will preferentially corrode instead of the metal of the gas turbine engine component. Examples of metals that may be used for the sacrificial anode layer include, but are not limited to, carbon steel, aluminum, mixed metal oxides, or combinations thereof. Mixed metal oxides may refer to sacrificial anode layers with a surface made from a mixture of platinum group metals covering a substrate made from titanium. The mixture of platinum group metals is electrically conductive and activates the titanium, such that it functions as a sacrificial anode. In addition, to provide sufficient driving force for the sacrificial anode layer to be preferentially corroded, the difference in the voltage potential between the two metals may be between approximately 0.1 to 1.5 volt, 0.2 to 1.0 volt, or 0.3 to 0.5 volt. In other words, the metal for the sacrificial anode layer may be approximately 10 percent, 50 percent, 500 percent, or 1,500 percent more electrochemically active than the metal for the gas turbine engine component. When properly selected, ions and electrons will flow under corrosive conditions from the sacrificial anode layer to the metal of the gas turbine engine component, which acts as the cathode, at a sufficient rate until the sacrificial anode layer is completely consumed. At that point, a new sacrificial anode layer is installed to continue to protect the gas turbine engine component from corrosion.

In other embodiments, an impressed current system may be used to actively protect metal from corrosion. In contrast to the sacrificial anode layers discussed above, the anode layer of an impressed current system is not consumed or is consumed very slowly during protection of the gas turbine engine component. Instead, the anode layer is connected to an external electrical power source and a transformer rectifier, which creates a potential difference between the anode layer and the structure to be protected. The potential difference impresses, or transfers, electrons from the aqueous medium via chemical oxidation/reduction reactions at a surface of the anode layer to the surface of the gas turbine engine component. Hence, in a properly configured system, the anode layer is not consumed. Because the anode layer of the impressed current system is not consumed, the anode layer may be smaller than sacrificial anode layers. The addition of electrons, or electrical current, from the anode layer to the gas turbine engine component may reduce aqueous and/or molten salt corrosion by helping to prevent the metal of the gas turbine engine from releasing electrons and being corroded. However, if the flow of electrons from the anode layer is insufficient, corrosion of the gas turbine engine component may still occur. Alternatively, if the flow of electrons is too high, the gas turbine engine component may be damaged by hydrogen embrittlement. Under certain conditions, hydrogen ions present in the electrolyte may be reduced to hydrogen atoms at the cathode. The hydrogen atoms may permeate the granular structure of certain metals, such as high strength steels, causing hydrogen embrittlement. Thus, one method to determine that a proper flow of electrons is transferred from the anode layer is to install a reference electrode in the gas turbine engine. The reference electrode may be used to monitor the electrical potential across the gas turbine engine component and the reference electrode and sends a signal to a controller to maintain the electrical potential across the reference electrode and the gas turbine engine component within an acceptable range. Reference electrodes may also be used with sacrificial anode layers to indicate when to replace the sacrificial anode layers.

With either sacrificial anode layers or impressed current systems, several steps may be performed to determine specifications of a corrosion protection system. First, a suitable protection potential of the metal used for the gas turbine engine component during operation is determined. Laboratory testing using a potentiostat may be used to predict the required protection potential if it cannot be measured during actual operation. Next, a protection current for the gas turbine engine component is determined. The protection current is a function of a surface area of the structure to be protected, an electrolyte flow rate, an operating temperature range, and a geometry of the protected structure. In addition, a suitable anode coverage scheme and configuration is determined based on the geometry of the protected structure and an anode throwing power, which may refer to an ability of the anode to protect recessed or blind areas of the structure. Next, a suitable surface area of the anode is determined to obtain an anode current that is greater than the protection current. The surface area of the anode is a function of the anode surface area and the material selected for the anode. Finally, a mass of anode material is determined as a function of the protection current and a suitable service time. This last step may not apply to impressed current systems as the anode layer is not typically consumed. Knowing these specifications, the corrosion protection system may be configured to help reduce corrosion of the gas turbine engine component.

Although described separately, both systems described above may be used simultaneously in certain embodiments of gas turbine engines. For example, if electrical current is unavailable for the impressed current system, the sacrificial anode layer may continue to protect the surface of the gas turbine engine component. Alternatively, if the sacrificial anode layer is completely consumed, the impressed current system may continue to help reduce corrosion. In other embodiments, the sacrificial anode layer or the impressed current system may be installed individually to reduce complexity and/or costs. Initially, using sacrificial anodes layers may be less costly and simpler than an impressed current system as no reference electrode, power source, transformer rectifier, and/or controller is used. However, the sacrificial anode layers are replaced on a regular basis as they are consumed, resulting in ongoing replacement costs and maintenance downtime.

Both sacrificial anode layers and impressed current systems offer several advantages over other methods of corrosion protection. For example, such systems may be less costly than using expensive corrosion resistant alloys. In addition, such systems may enable operation of the gas turbine engine at higher pressures and temperatures where efficiency is greater. Lower pressures and temperatures may reduce corrosion, but also reduce efficiency. Finally, such systems may enable lower quality and/or less expensive fuel to be combusted in the gas turbine engine. Higher quality fuel may contain fewer corrosive gases, but may be more expensive than lower quality fuel.

Turning now to the drawings, FIG. 1 is a diagram of an embodiment of an IGCC system 100 that may produce and burn syngas. The IGCC system 100 may include an embodiment of a turbine engine component with surfaces subject to corrosion that are protected by sacrificial anode layers and/or impressed current systems. Other elements of the IGCC system 100 may include a fuel source 102, which may be a solid or a liquid, that may be utilized as a source of energy for the IGCC system. The fuel source 102 may include coal, petroleum coke, oil, biomass, wood-based materials, agricultural wastes, tars, coke oven gas and asphalt, or other carbon containing items.

The fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock. In further embodiments, the feedstock preparation unit 104 may be omitted if the fuel source 102 is a liquid.

The feedstock may be passed to a gasifier 106 from the feedstock preparation unit 104. The gasifier 106 may convert the feedstock into a syngas, e.g., a combination of carbon monoxide (CO) and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius (C) to 1600 degrees C., depending on the type of gasifier 106 utilized. The gasification process may include the feedstock undergoing a pyrolysis process, whereby the feedstock is heated. Temperatures inside the gasifier 106 may range from approximately 150 degrees C. to 700 degrees C. during the pyrolysis process, depending on the fuel source 102 utilized to generate the feedstock. The heating of the feedstock during the pyrolysis process may generate a solid (e.g., char) and residue gases (e.g., CO, hydrogen, and nitrogen). The char remaining from the feedstock from the pyrolysis process may only weigh up to approximately 30% of the weight of the original feedstock.

The volatiles generated during the pyrolysis process, also known as devolatilization, may be partially combusted by introducing oxygen to the gasifier 106. The volatiles may react with the oxygen to form $CO_2$ and CO in combustion reactions, which provide heat for the subsequent gasification reactions. The temperatures generated by the combustion reactions may range from approximately 700 degrees C. to 1600 degrees C. Next, steam may be introduced into the gasifier 106 during a gasification step. The char may react with the $CO_2$ and steam to produce CO and hydrogen at temperatures ranging from approximately 800 degrees C. to 1100 degrees C. In essence, the gasifier utilizes steam and oxygen to allow some of the feedstock to be "burned" to produce CO and release energy, which drives a second reaction that converts further feedstock to hydrogen and additional $CO_2$.

In this way, the gasifier 106 manufactures a resultant gas. This resultant gas may include approximately 85% of CO and hydrogen in equal proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The gasifier 106 may also generate waste, such as slag 108, which may be a wet ash material. This slag 108 may be removed from the gasifier 106 and disposed of, for example, as road base or as another building material. A gas purifier 110 may be utilized to clean the untreated syngas. In one embodiment, the gas purifier 110 may be a water gas shift reactor. The gas purifier 110 may scrub the untreated syngas to remove the HCl, HF, COS, HCN, and $H_2S$ from the untreated syngas, which may include separation of sulfur 111 in a sulfur processor 112. Furthermore, the gas purifier 110 may separate salts 113 from the untreated syngas via a water treatment unit 114 that may utilize water purification techniques to generate usable salts 113 from the untreated syngas. Subsequently, the gas from the gas purifier 110 may include treated syngas (e.g., the sulfur 111 has been removed from the syngas), with trace amounts of other chemicals, e.g., $NH_3$ (ammonia) and $CH_4$ (methane).

In some embodiments, a gas processor may be utilized to remove additional residual gas components, such as ammonia and methane, as well as methanol or any residual chemicals from the treated syngas. However, removal of residual gas components from the treated syngas is optional, because the treated syngas may be utilized as a fuel even when it includes the residual gas components, e.g., tail gas. At this point, the treated syngas may include approximately 3% CO, approximately 55% $H_2$, and approximately 40% $CO_2$ and is substantially stripped of $H_2S$.

In some embodiments, a carbon capture system 116 may remove and process the carbonaceous gas (e.g., carbon dioxide that is approximately 80-100 or 90-100 percent pure by volume) included in the syngas. The carbon capture system 116 also may include a compressor, a purifier, a pipeline that supplies $CO_2$ for sequestration or enhanced oil recovery, a $CO_2$ storage tank, or any combination thereof. The captured carbon dioxide may be transferred to a carbon dioxide expander, which decreases the temperature of the carbon dioxide (e.g., approximately 5-100 degrees C., or about 20-30 degrees C.), thus enabling the carbon dioxide to be used as a suitable cooling agent for the system. The cooled carbon dioxide (e.g., approximately 20-40 degrees C., or about 30 degrees C.) may be circulated through the system to meet its refrigeration needs or expanded through subsequent stages for even lower temperatures. The treated syngas, which has undergone the removal of its sulfur containing components and a large fraction of its carbon dioxide, may be then transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally, the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131, and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. Surfaces of the gas turbine engine 118 in contact with the exhaust gases, components of which may condense into liquids, may be subject to corrosion and thus, may be protected by sacrificial anode layers and/or impressed current systems. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. The drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. Surfaces of the steam turbine engine 136 and/or HRSG 138 may be subject to corrosion and thus, may also be protected by sacrificial anode layers and/or impressed current systems. The steam turbine engine 136 may drive a second load 140. The second load 140 may also be an electrical generator for generating electrical power. However, both the first 130 and second 140 loads may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems, such as the IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
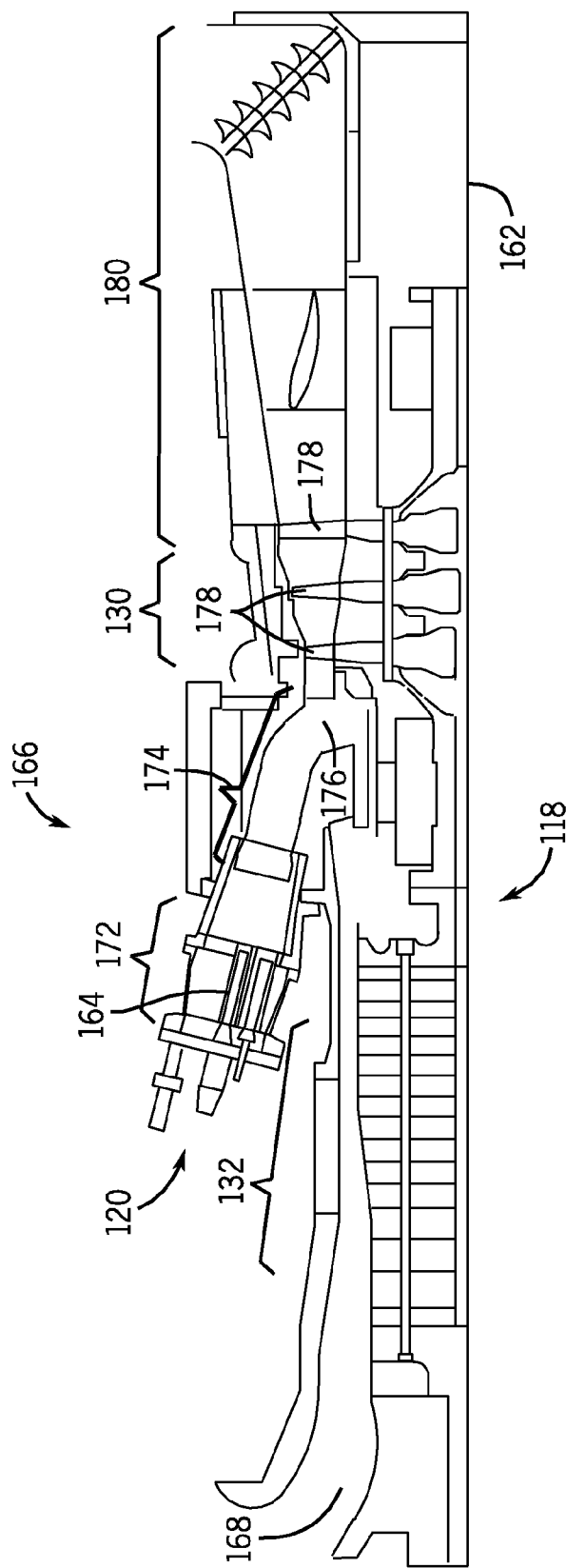
FIG. 2 is a sectional view of an embodiment of the gas turbine engine of FIG. 1 sectioned through the longitudinal axis.

FIG. 2 is a cross-sectional side view of an embodiment of the gas turbine engine 118 of FIG. 1 taken along a longitudinal axis 162. In addition to being used as a component of the IGCC system 100 described above, the gas turbine engine 118 may be located in an aircraft, a watercraft, a locomotive, a power generation system, or combinations thereof. The gas turbine engine 118 includes one or more fuel nozzles 164 located inside a combustor section 166. In certain embodiments, the gas turbine engine 118 may include multiple combustors 120 disposed in an annular arrangement. Further, each combustor 120 may include multiple fuel nozzles 164 attached to or near the head end of each combustor 120 in an annular or other arrangement.

As described above with respect to FIG. 1, air may enter the gas turbine engine 118 through an air intake section 168 and may be compressed by the compressor 132. As appreciated, the compressor 132 may include one or more compressor stages disposed one after another. The compressed air from the compressor 132 may then be directed into the combustor section 166 where the compressed air may be mixed with fuel. For example, the fuel nozzles 164 may inject a fuel-air mixture into the combustors 120 in a suitable ratio for optimal combustion, emissions, fuel consumption, and power output.

Each combustor 120 may include a primary combustion region 172 and a secondary combustion region 174. In general, the fuel nozzles 164 may be part of the primary combustion region 172. Within the primary combustion region 172, the fuel-air mixture may combust to generate hot, pressurized combustion gases. The combustion gases may then enter the secondary combustion region 174 where additional fuel may be injected to further combust the fuel-air mixture. From the secondary combustion region 174, the hot pressurized combustion gases may exit the combustor section 166 and flow through a transition piece 176 to the turbine 130. Within the turbine 130, the pressurized combustion gases may turn blades 178 that extend radially within the turbine 130 to rotate the drive shaft 131 (FIG. 1) before exiting through an exhaust section 180 as exhaust gases. For example, the combustion gases may flow through one or more turbine stages disposed one after another. As the primary combustion region 172, the secondary combustion region 174, the transition piece 176, the turbine 130, and the exhaust section 180 all may come in contact with hot condensing combustion gases, surfaces in these areas may be protected by sacrificial anode layers and/or impressed current systems. For example, the sacrificial anode layers and/or impressed current systems may be coupled to stationary or moving components anywhere along the flow path of the hot combustion gases through the gas turbine engine 118.

Figure 3:
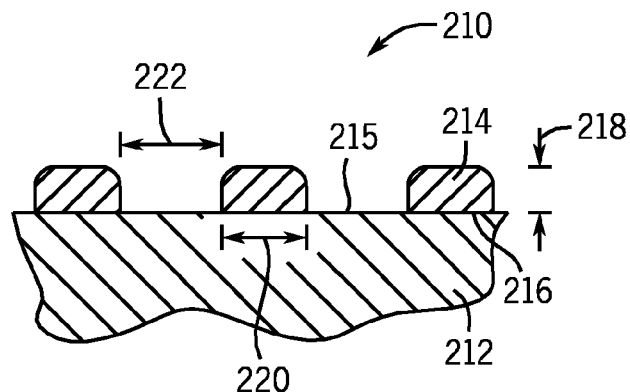
FIG. 3 is a partial cross-sectional view of an embodiment of a turbine engine component with a raised anode layer.

With the forgoing in mind, FIG. 3 is a partial cross-sectional view of an embodiment of a system 210 with a gas turbine engine component 212 and an anode layer 214, which may be a sacrificial anode layer or an anode layer used in an impressed current system, that is raised above a surface 215. In the illustrated embodiment, the gas turbine engine component 212 may be exposed to a fluid flow path, such as hot exhaust gases. The gas turbine engine component 212 may include a turbine combustor, a fuel nozzle, a turbine nozzle, a turbine shroud, a turbine blade, or any surface exposed to the hot exhaust gases. The anode layer 214 may be coupled to the surface 215 of the gas turbine engine component 212 to protect the gas turbine engine component 212.

In certain embodiments, the anode layer 214 is continuously adhered to the surface 215 of the gas turbine engine component 212 at an interface 216. Suitable methods for attaching metals together may be used at the interface 216, such as, but not limited to, printing, spray coating, brushing, electrochemical deposition, dipping, photo etching, sputtering, or combinations thereof. For example, a layer of metal may be bonded to the gas turbine engine component 212 and a temporary mask with the pattern for the anode layer 214 applied on the metal layer. The unwanted metal may then be removed using etching or milling, leaving behind the patterned anode layer 214. Thus, the anode layer 214 is raised above the surface 215 of the gas turbine engine component 212 by a height 218. For example, the height 218 may be between approximately 0.1 to 5 mm, 0.3 to 3 mm, or 0.5 to 1 mm. In certain embodiments, the anode layer 214 may have a width 220 and portions of the anode layer 214 may be separated from one another by a separation distance 222.

The anode layer 214 may be configured as a sacrificial anode layer, which may be consumed during operation of the gas turbine engine 118 as described above. This occurs because the metal used for the anode layer 214 is electrochemically more active than the metal used for the gas turbine engine component 212. Thus, the anode layer 214 preferentially corrodes to protect the gas turbine engine component 212. Additionally or alternatively, an impressed current system may be used and the anode layer 214 provides electrons from the aqueous medium via oxidation/reduction reactions with the aqueous medium to help reduce corrosion of the gas turbine engine component 212 without being consumed itself. As described below, portions of the anode layer 214 may be electrically connected to one another to enable a single transformer rectifier to impress electrical current to all the connected portions of the anode layer 214.

Figure 4:
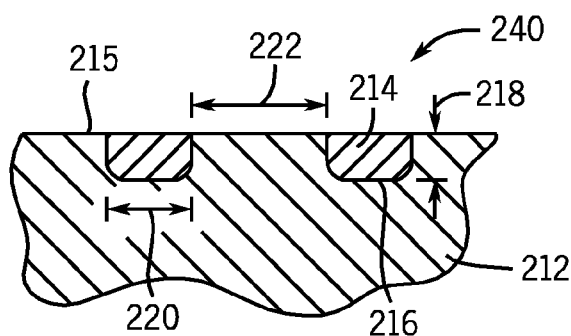
FIG. 4 is a partial cross-sectional view of an embodiment of a turbine engine component with a recessed anode layer.

FIG. 4 shows a partial cross-sectional view of an embodiment of a system 240 with the gas turbine engine component 212 protected by the anode layer 214, which is recessed below the surface 215 of the component. Elements in common with those shown in FIG. 3 are labeled with the same reference numerals. In the illustrated embodiment, the outer surface of the anode layer 214 is flush with the surface 215 of the gas turbine engine component 212. Thus, portions of the anode layer 214 fit into recessed areas removed from the surface 215 of the gas turbine engine component 212. In certain embodiments, such a configuration with a recessed anode layer 214 may provide a smooth surface for hot exhaust gases flowing along the gas turbine engine component 212. Because of the high flow rate of gases flowing through the gas turbine engine 118, it may be desirable for internal surfaces of the gas turbine engine 118 to be aerodynamically shaped to provide low resistance to the flow of gases. Therefore, the recessed anode layer 214 shown in FIG. 4 may be used on surfaces 215 of the gas turbine engine 118 where aerodynamic performance is desired. In addition, in other embodiments, impressed current systems may be used instead of sacrificial anode layers because as sacrificial anode layers are consumed, they may disrupt the flow of gases.

Figure 5:
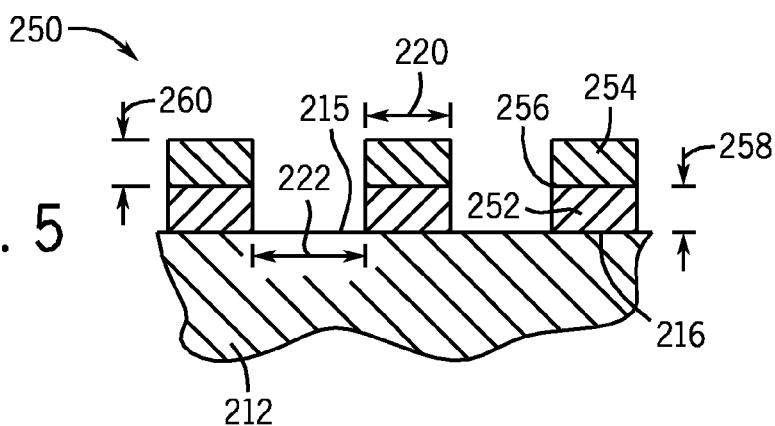
FIG. 5 is a partial cross-sectional view of a turbine engine component with portions of two anode layers stacked one over another.

FIG. 5 is a partial cross-sectional view of an embodiment of a system 250 with the gas turbine engine component 212 and two different sacrificial anode layers. Elements in common with those shown in FIG. 3 are labeled with the same reference numerals. Specifically, portions of a first anode layer 252 may be coupled to the surface 215 of the gas turbine engine component 212. In addition, portions of a second anode layer 254 may be coupled to the first anode layer 252 at an interface 256. Thus, the second and first anode layers 254 and 252 are vertically stacked one over another relative to the surface 215 of the gas turbine engine component 212. Suitable methods of attaching metals together may be used at the interface 256 to join the first and second anode layers 252 and 254 together. Specific examples of such methods of attaching metals together are discussed above with respect to FIG. 3. In addition, the electrochemical activities of the first and second anode layers 252 and 254 may differ. For example, in certain embodiments, the electrochemical activity of the second anode layer 254 may be greater than the electrochemical activity of the first anode layer 252. In such embodiments, the second anode layer 254 may preferentially corrode to protect both the first anode layer 252 and the gas turbine engine component 212. If the second anode layer 254 is completely consumed, then the first anode layer 252 may preferentially corrode to protect the gas turbine engine component 212.

Because the electrochemical activities of the first and second anode layers 252 and 254 may differ in particular embodiments, the surface areas and configurations of the first and second anode layers 252 and 254 may also differ. Specifically, portions of the first anode layer 252 may have a first height 258 and portions of the second anode layer 254 may have a second height 260. In various embodiments, the first and second heights 258 and 260 may be the same or different. For example, in particular embodiments, the second height 260 may be greater than the first height 258 because the second anode layer 254 may be consumed at a faster rate than the first anode layer 252. Furthermore, the widths 220 of the portions of the first and second anode layers 252 and 254 may be the same or different in various embodiments. In addition, in certain embodiments, one or both of the first and second anode layers 252 and 254 may be recessed similar to the recessed anode layer 214 shown in FIG. 4 to provide an aerodynamic surface for the gas turbine engine component 212.

Figure 6:
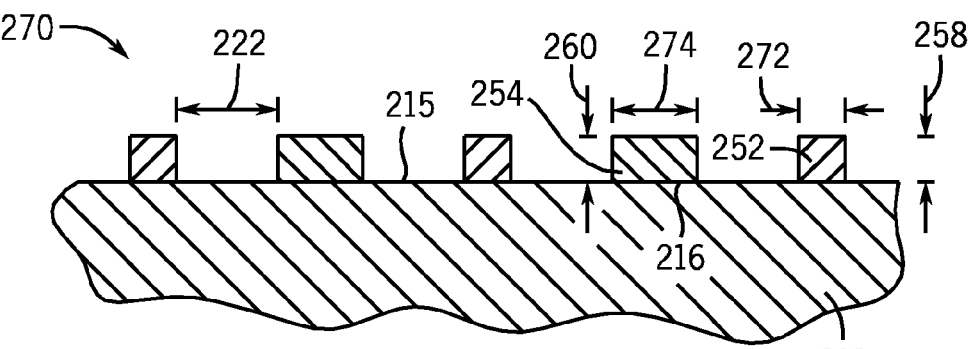
FIG. 6 is a partial cross-sectional view of a turbine engine component with portions of two anode layers alternating side by side.

FIG. 6 is a partial cross-sectional view of an embodiment of a system 270 with the gas turbine engine component 212 and portions of two anode layers alternating side by side. Elements in common with those shown in FIG. 5 are labeled with the same reference numerals. In the illustrated embodiment, portions of both the first anode layer 252 and the second anode layer 254 are coupled to the surface 215 of the gas turbine engine component 212 at the interface 216. Portions of the first anode layer 252 may have a first width 272 and portions of the second anode layer 254 may have a second width 274, which may differ as shown in FIG. 6. As with the system 250 shown in FIG. 5, the heights, widths, and/or shapes of the portions of the first and second anode layers 252 and 254 may be configured based on the relative electrochemical activities of the first and second anode layers 252 and 254. Although shown in an alternating pattern in FIG. 6, the portions of the first and second anode layers 252 and 254 may be configured differently. For example, in some embodiments, portions of the first anode layer 252 may be located together in one area of the gas turbine engine component 212 and portions of the second anode layer 254 may be located together in a different area of the gas turbine engine component 212. Thus, the more electrochemically active second anode layers 254 may be located in areas of the gas turbine engine component 212 that are more susceptible to corrosion. In addition, in other embodiments, the first and second anode layers 252 and 254 may be recessed to provide a smoother surface for the gas turbine engine component 212. Furthermore, in certain embodiments, the separation distance 222 may be zero and the portions of the first and second anode layers 252 and 254 may touch each other. In addition, the separation distance 222 may be the same between the first and second anode layers 252 and 254 or may be different.

Figure 7:
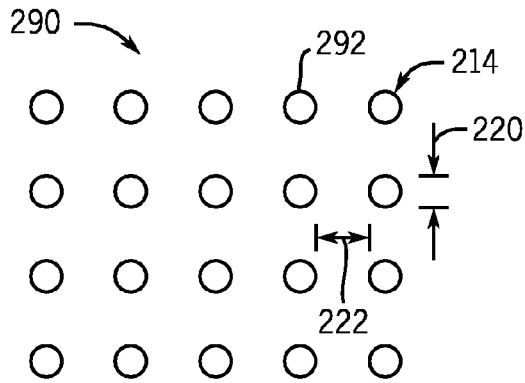
FIG. 7 is a partial surface view of an embodiment of a turbine engine component with an anode layer patterned as hollow circular shapes.

Turning now to various patterns of anode layers that may be used in the embodiments of FIGS. 3-6 or elsewhere, FIG. 7 shows a partial surface view of an embodiment of an anode system 290 made up of hollow circular shapes (e.g., rings). Elements in FIGS. 7-17 in common with those shown in earlier figures are labeled with the same references numerals. In the illustrated embodiment, each portion of the patterned anode layer 214 includes a ring 292 coupled to the surface 215 of the gas turbine component 212. In various embodiments, the rings 292 of the patterned anode layer 214 may be recessed in the surface 215 of the gas turbine component 212 and/or may be located above the surface 215 of the gas turbine component 212. The rings 292 may attached to the surface 215 of the gas turbine component 212 using a variety of techniques, including, but not limited to, printing, spray coating, brushing, electrochemical deposition, dipping, photo etching, sputtering, or combinations thereof. Because the rings 292 of the patterned anode layer 214 shown in FIG. 7 are disconnected or not touching, the anode system 290 uses sacrificial anodes and is not an impressed current system. In other embodiments, the rings 292 may connect with one another and a source of electrical current connects to the patterned anode layer 214 for use as an impressed current system. Although the rings 292 are shown in rows and columns, the rings 292 of the anode system 290 may be arranged in other patterns or in irregular patterns in further embodiments. For example, the rings 292 of the patterned anode layer 214 may be arranged in one or more circular patterns, such as concentric arrangements of the rings 292. In certain embodiments, the anode system 290 may cover the surfaces 215 of gas turbine components 212 that contact hot exhaust gases. In addition, by using a dispersed patterned anode layer 214, the throwing power of the anodes may be distributed evenly across the surface 215 of the protected gas turbine engine component 212.

Figure 8:
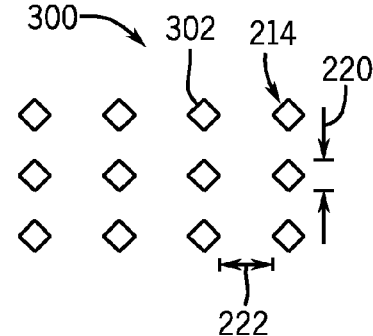
FIG. 8 is a partial surface view of an embodiment of a turbine engine component with an anode layer patterned as diamonds.

FIG. 8 shows a partial surface view of an embodiment of an anode system 300 made up of diamonds 302. In the illustrated embodiment, the portions of the patterned anode layer 214 are shaped like diamonds or squares 302, which may be hollow or solid. Such a shape may be easier to fabricate than shapes with curved lines. In addition, if the diamonds or squares 302 of the patterned anode layer 214 are recessed in the surface 215 of the gas turbine engine component 212, straight lines may be easier to cut than curved lines. In other respects, the anode system 300 shown in FIG. 8 may be similar to the anode system 290 of FIG. 7 and techniques such as those listed above may be used to attach the diamonds or squares 302 to the surface 215 of the gas turbine component 212. Again, the diamonds or squares 302 may be connected or disconnected relative to one another. If the squares 302 are connected, then the anode system 300 may include a single transformer rectifier to supply current for operation as an impressed current system. If the squares 302 are disconnected, then the system 300 may operate as a sacrificial anode system.

Figure 9:
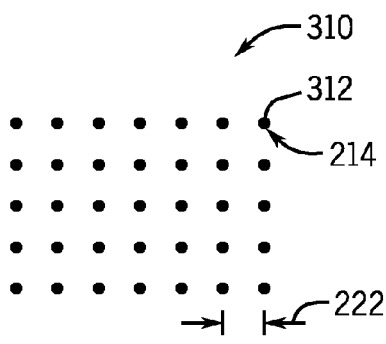
FIG. 9 is a partial surface view of an embodiment of a turbine engine component with an anode layer patterned as solid circular shapes.

FIG. 9 shows a partial surface view of an embodiment of an anode system 310 made up of solid circular shapes 312. In the illustrated embodiment, the solid circular shapes 312 of the patterned anode layer 214 are smaller than the rings 215 and squares 302 shown in either FIG. 7 or FIG. 8. Such an anode system 310 may help provide an aerodynamic surface for the gas turbine engine component 212, as each solid circular shape 312 of the patterned anode layer 214 may provide less resistance to gas flow than larger portions. In addition, the solid circular shapes 312 of the patterned anode layer 214 shown in FIG. 9 may be easier to install along the surface 215 of the gas turbine engine component 212. For example, in certain embodiments, small threaded holes may be tapped into the surface 215 of the gas turbine engine component 212 and the solid circular shape 312 of the patterned anode layer 214 may be threaded to screw into the holes in the surface 215 of the gas turbine engine component 212. Such threaded connections may be easier to fabricate and/or provide for easier installation than other methods. In other respects, the anode system 310 shown in FIG. 9 may be similar to previous anode systems. Specifically, similar techniques may be used to attach the solid circular shapes 312 to the surface 215 of the gas turbine component 212. In addition, the solid circular shapes 312 may be connected to operate as an impressed current system or disconnected relative to one another to operate as a sacrificial anode system.

Figure 10:
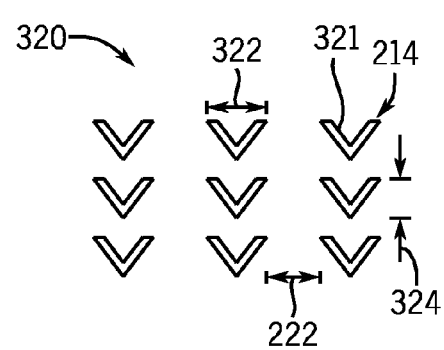
FIG. 10 is a partial surface view of an embodiment of a turbine engine component with an anode layer patterned as chevrons.

FIG. 10 shows a partial surface view of an embodiment of an anode system 320 made up of chevrons 321, which may be hollow or solid. The chevrons 321 of the patterned anode layer 214 may provide less resistance to gases flowing over the surface 215 of the gas turbine engine component 212 in the direction of the chevrons 321. With respect to attachment techniques and operation as either an impressed current system or a sacrificial anode system, the chevrons 321 of the anode system 320 are similar to previous anode systems.

Figure 11:
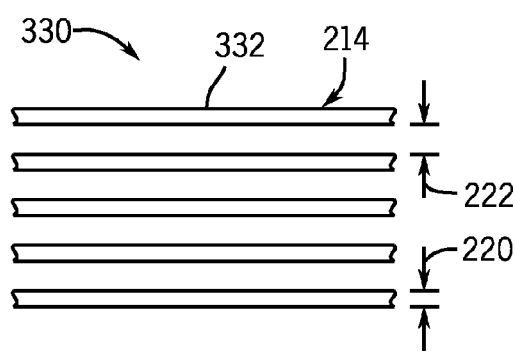
FIG. 11 is a partial surface view of an embodiment of a turbine engine component with an anode layer patterned as rectangular strips.

FIG. 11 shows a partial surface view of an embodiment of an anode system 330 made up of rectangular strips 332, which may be hollow or solid. The configuration of the anode system 330 may improve the aerodynamics of the gas turbine engine component 212. For example, in certain embodiments, the rectangular strips 332 of the patterned anode layer 214 may be aligned in the direction of the exhaust gas flow. Thus, the rectangular strips 332 of the patterned anode layer 214 may provide less flow resistance to the exhaust gases and may help direct the exhaust gases in a particular direction. In addition, the rectangular strips 332 of the anode system 330 are similar to previous anode systems with respect to attachment techniques and operation as either an impressed current system or a sacrificial anode system.

Figure 12:
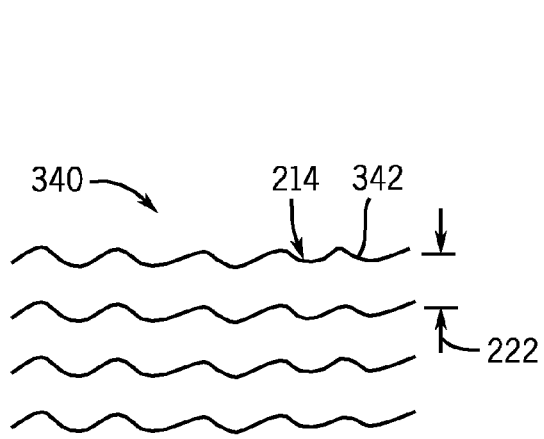
FIG. 12 is a partial surface view of an embodiment of a turbine engine component with an anode layer patterned as waves

FIG. 12 shows a partial surface view of an embodiment of an anode system 340 made up of waves or wave shaped portions 342, which are solid. In the illustrated embodiment, the wave shaped portions 342 of the patterned anode layer 214 may be aligned in the direction of exhaust gas flow as with the anode system 330 of FIG. 11. Thus, the configuration of the anode system 340 may help improve the aerodynamics of the gas turbine engine component 212 and/or help direct the exhaust gases along the surface 215 of the gas turbine engine component 212. In some embodiments, thin recessed channels for the wave shaped portions 342 of the patterned anode layer 214 may be easier to cut into the surface 215 of the gas turbine engine component 212 than wider shapes. In other embodiments, straighter or less curved channels for the wave shaped portions 342 may be easier to fabricate. In other respects, the wave shaped portions 342 of the anode system 340 are similar to previously discussed anode systems.

Figure 13:
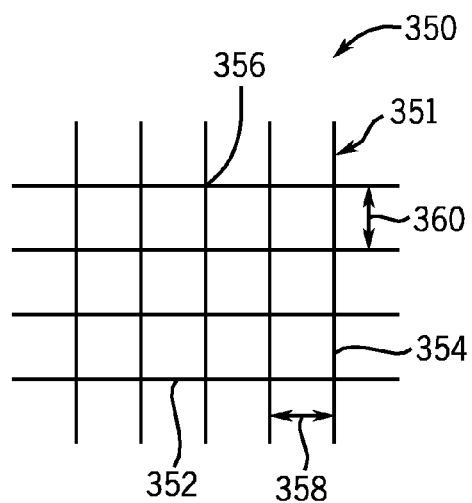
FIG. 13 is a partial surface view of an embodiment of a turbine engine component with an anode layer patterned as a grid.

FIGS. 13-16 are partial surface views of embodiments of anode systems suitable for impressed current systems. FIG. 13 shows a partial surface view of an embodiment of an anode system 350 having a grid 351. In certain embodiments, the grid 351 may be continuously adhered to the surface 215 of the gas turbine engine component 212 via a printing method similar to that used to prepare printed circuit boards (PCBs). Examples of such methods include, but are not limited to, silkscreen printing, photoengraving, PCB milling, or combinations thereof. In other embodiments, a temporary mask with open portions corresponding to the grid 351 may be applied to the surface 215 of the gas turbine engine component 212 and the metal sprayed on to create the grid 351. Furthermore, the grid 351 of system 350 includes horizontal members 352 and vertical members 354 in a perpendicular arrangement. Alternatively, the members 352 and 354 may be non-perpendicular to one another. The horizontal and vertical members 352 and 354 interconnect at points 356, which provide for electrical continuity throughout the system 350. The vertical members 354 are spaced apart by a first distance 358 and the horizontal members 352 are spaced apart by a second distance 360. In various embodiments, the distances 358 and 360 may be the same or different. In addition, although shown with regular horizontal and vertical spacing, in further embodiments, the horizontal and vertical members 352 and 354 may be spaced apart at different intervals or at irregular intervals. As the horizontal and vertical members 352 and 354 of the system 350 are interconnected, a negative pole of the transformer rectifier for the impressed current system may be connected to only one portion of the grid 351 of system 350. A positive pole of the transformer rectifier for the impressed current system may be connected to the surface 215 of the gas turbine engine component 212. Thus, electrons may flow from the aqueous medium at the surface of the grid 351, through the electrolyte, and to the gas turbine engine component 212.

Figure 14:
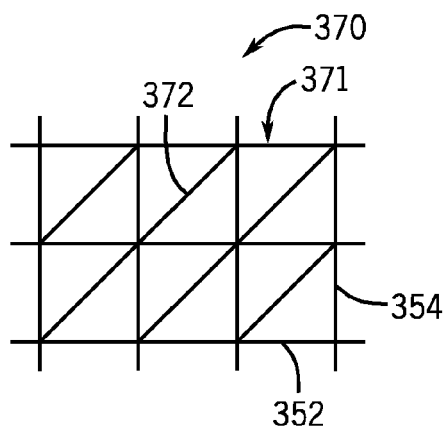
FIG. 14 is a partial surface view of an embodiment of a turbine engine component with an anode layer patterned as a grid with angled cross-members.

FIG. 14 is a partial surface view of an embodiment of an anode system 370 having a grid 371 with angled cross-members 372 between the members 352 and 354. In the illustrated embodiment, the angled cross-members 372 provide additional electrical paths through the system 370. Such a configuration may provide for a more evenly dispersed throwing power for the system 370. Other aspects of the system 370 are similar to those of the system 350 of FIG. 13. For example, techniques such as, but not limited to, printing, spray coating, brushing, electrochemical deposition, dipping, photo etching, sputtering, or combinations thereof, may be used to attach the grid 371 to the surface 215 of the gas turbine engine component 212.

Figure 15:
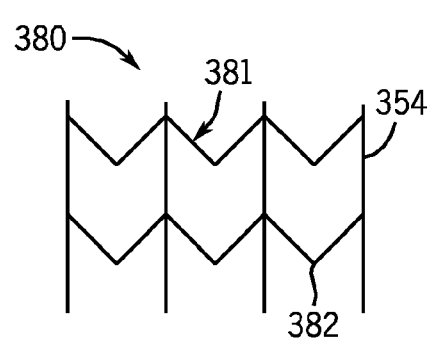
FIG. 15 is a partial surface view of an embodiment of a turbine engine component with an anode layer patterned as a grid with chevrons.

FIG. 15 is a partial surface view of an embodiment of an anode system 380 configured as a grid 381 with chevrons 382. In the illustrated embodiment, the chevrons 382 interconnect the vertical members 354. Such a configuration of the system 380 may provide aerodynamic advantages for exhaust gases passing over the surface 215 of the gas turbine component 212 in the direction of the chevrons 382. With respect to attachment techniques and operation as an impressed current system, the chevrons 382 of the anode system 380 are similar to anode systems 350 and 370.

Figure 16:
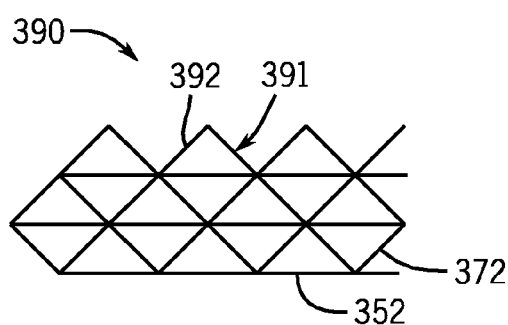
FIG. 16 is a partial surface view of an embodiment of a turbine engine component with an anode layer patterned as a grid with triangles.

FIG. 16 shows a partial surface view of an embodiment of an anode system 390 configured as a grid 391 with triangles 392. The triangles 392 in the illustrated embodiment are formed from alternating angled cross-members 372. As with the system 370 of FIG. 14, such a configuration may provide for a more evenly dispersed throwing power for the system 390. Other aspects of the system 390 are similar to those of impressed current systems discussed above.

Figure 17:
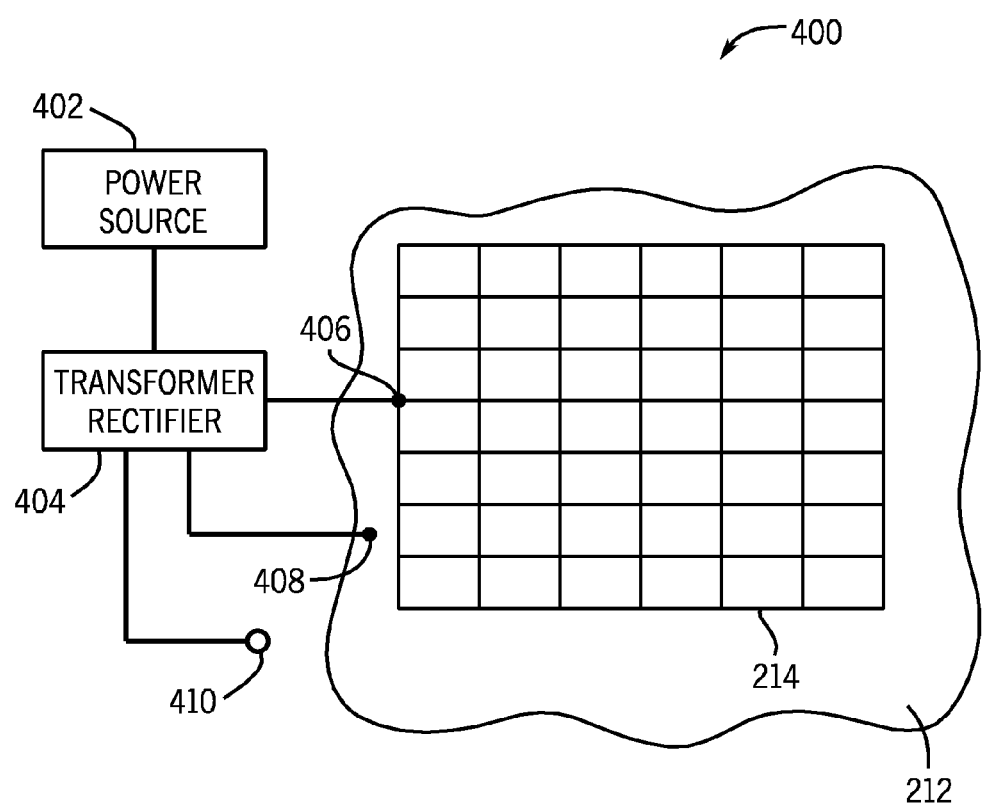
FIG. 17 is a schematic of a system that controls an electrical current to a patterned anode layer.

FIG. 17 shows a schematic of an embodiment of a system 400 that includes a controller to adjust electrical current to the anode layer 214. In the illustrated embodiment of the impressed current system, a power source 402 provides a relatively constant source of electric current, such as alternating current (AC), to a transformer rectifier 404. For example, the power source 402 may provide high voltage 3-phase AC to the transformer rectifier 404, which may "step down" the voltage to a lower voltage and convert the AC to direct current (DC). By connecting the positive terminal of the transformer rectifier 404 to the anode layer 214 at first connection 406 and connecting the negative terminal to the gas turbine engine component 212 at second connection 408, the transformer rectifier 404 provides a potential difference across the anode layer 214 and the gas turbine engine component 212. Connection of the gas turbine engine component 212 and the anode layer 214 via electrical contact and ionic contact in the aqueous medium completes the electrochemical circuit. Thus, electrons flow from the aqueous medium at the surface of the anode layer 214, through the electrolyte, and to the gas turbine engine component 212. However, the electrochemical current is said to flow in the opposite direction according to normal convention.

In addition, a reference electrode 410 may be connected to the transformer rectifier 404 of system 400. The reference electrode 410 may represent a fixed potential against which the measured potential of the gas turbine engine component 212 may be compared. In addition, the transformer rectifier 404 may act as a controller to maintain the proper protection potential across the reference electrode 410 and the gas turbine engine component 212. The protection potential may be determined based on laboratory testing or actual operating measurements as described above. For example, in certain embodiments, the reference electrode 410 may indicate via feedback to the transformer rectifier 404 (or controller) that the measured potential across the reference electrode 410 and the gas turbine engine component 212 is less than the proper protection potential. The transformer rectifier 404 may then increase the electrical potential difference between the anode layer 214 and the gas turbine engine component 212, such that the current increases from the anode layer 214 to the gas turbine engine component 212. Thus, by using the reference electrode 410 and the transformer rectifier 404, the system 400 may continually adjust to respond to changing conditions and help reduce corrosion of the gas turbine engine component 212. In addition, although the system 400 represents an impressed current system, sacrificial anodes may be coupled to the gas turbine engine component 212 to serve as a backup method of corrosion protection as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbine engine component comprising a first material having a surface exposed to a fluid flow path, wherein the fluid flow path is disposed within a turbine engine; and
   a sacrificial anode layer disposed on the surface, wherein the sacrificial anode layer comprises a second material that is electrochemically more active than the first material, and the second material is configured to preferentially corrode to protect the first material from corrosion.

2. The system of claim 1, wherein the sacrificial anode layer comprises a patterned layer of the second material.

3. The system of claim 2, wherein the patterned layer comprises a plurality of sacrificial anode portions that are connected to one another.

4. The system of claim 2, wherein the patterned layer comprises a plurality of sacrificial anode portions that are disconnected from one another.

5. The system of claim 2, wherein the patterned layer comprises a patterned coating continuously adhered to the surface.

6. The system of claim 1, wherein the sacrificial anode layer comprises a third material that is electrochemically more active than the first material and the second material.

7. The system of claim 6, wherein the second material is disposed in a first pattern of a plurality of first sacrificial anode portions, the third material is disposed in a second pattern of a plurality of second sacrificial anode portions, and the first and second sacrificial anode portions are disposed side by side or one over another relative to the surface.

8. The system of claim 1, wherein the second material is at least greater than approximately 10 percent more electrochemically active than the first material.

9. The system of claim 1, wherein the second material comprises carbon steel, aluminum, mixed metal oxides, or a combination thereof.

10. The system of claim 1, wherein the turbine engine component is a part of a gas turbine combustor or a gas turbine section of a gas turbine engine, and the fluid flow path is a combustion gas path.

11. A system, comprising:
    a gas turbine engine comprising a first material having a surface exposed to a flow path of hot condensing combustion gas; and
    a patterned anode layer comprising a second material disposed on the surface, wherein the patterned anode layer is configured to protect the surface from corrosion by the hot condensing combustion gas.

12. The system of claim 11, wherein the second material is electrochemically more active than the first material, and the second material is configured to preferentially corrode to protect the first material from corrosion by the hot condensing combustion gas.

13. The system of claim 11, comprising a power source that supplies power to a transformer rectifier coupled to the patterned anode layer, wherein the transformer rectifier is configured to impress a current through the patterned anode layer to actively protect the first material from corrosion by the hot condensing combustion gas.

14. The system of claim 11, wherein the patterned anode layer is recessed into the surface to provide a smooth surface along the flow path.

15. The system of claim 11, wherein the patterned anode layer comprises a grid of the second material.

16. The system of claim 15, wherein the grid is a printed grid continuously adhered to the surface.

17. The system of claim 11, wherein the patterned anode layer comprises a third material that is different than the first and second materials.

18. A system, comprising:
a patterned anode layer configured to protect a surface of a as turbine engine from corrosion by hot condensing combustion gas;
a reference electrode in contact with the hot condensing combustion gas; and
a controller configured to adjust a current to the patterned anode layer in response to feedback from the reference electrode.

19. The system of claim 18, comprising the gas turbine engine having the surface.

20. The system of claim 18, wherein the feedback from the reference electrode is indicative of an electrical potential difference across the reference electrode and the as turbine engine.

* * * * *

UNITED STATES PATENT AND TRADEMARK OFFICE
CERTIFICATE OF CORRECTION

| | |
|---|---|
| PATENT NO. | : 8,268,134 B2 |
| APPLICATION NO. | : 12/785258 |
| DATED | : September 18, 2012 |
| INVENTOR(S) | : Goller et al. |

Page 1 of 1

It is certified that error appears in the above-identified patent and that said Letters Patent is hereby corrected as shown below:

In Column 18, Line 6, in Claim 18, delete "as" and insert -- gas --, therefor.

In Column 18, Line 17, in Claim 20, delete "as" and insert -- gas --, therefor.

Signed and Sealed this
Fifteenth Day of January, 2013

David J. Kappos
*Director of the United States Patent and Trademark Office*